April 18, 1967    J. J. JUSTICE    3,314,093
MULLING OF SHOE UPPERS
Filed Nov. 24, 1964    12 Sheets-Sheet 4

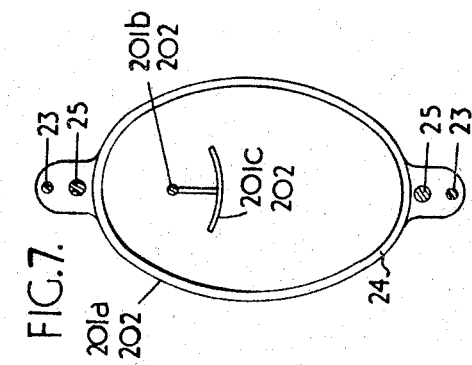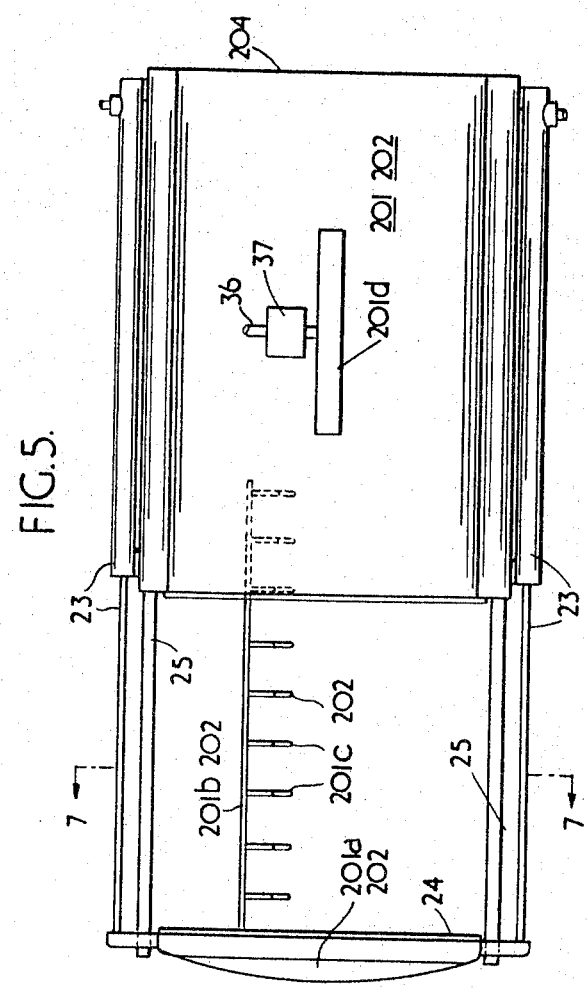

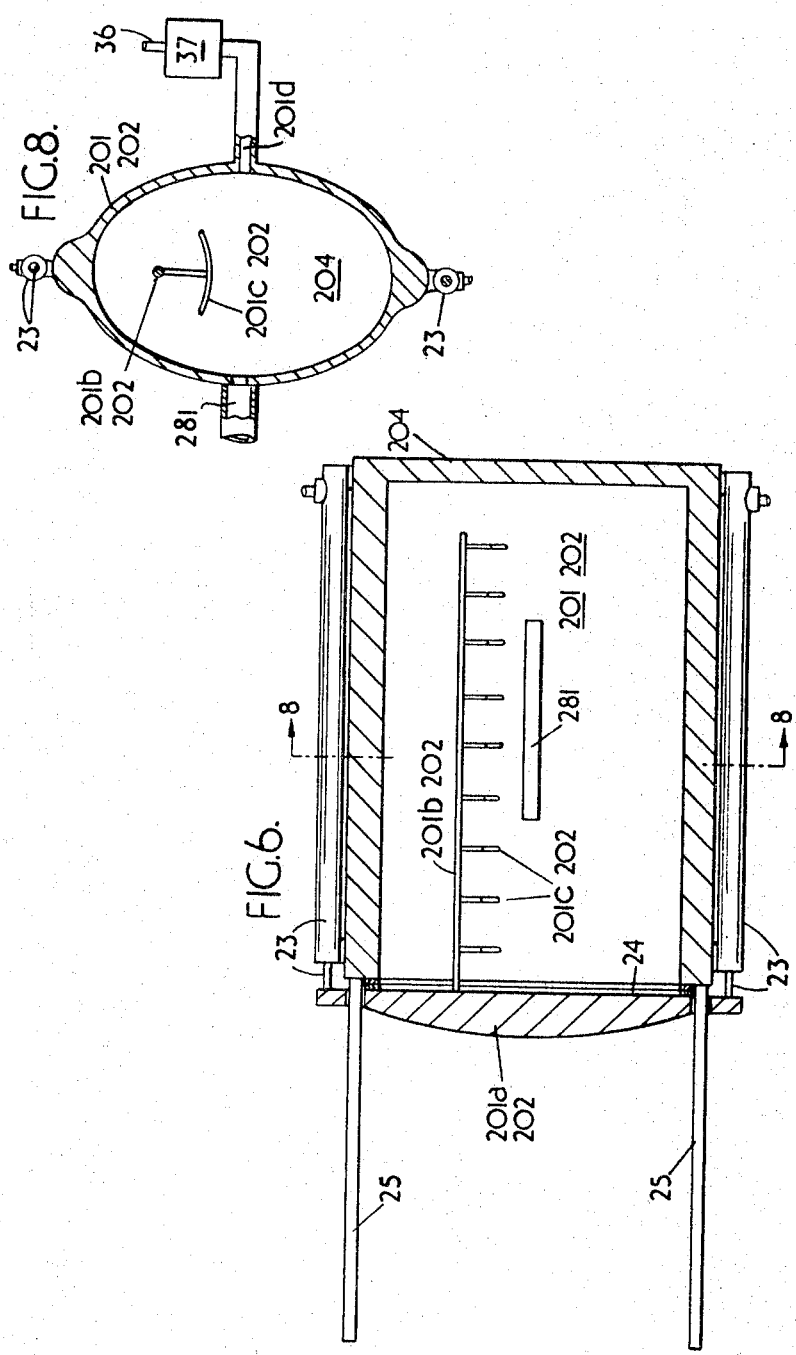

April 18, 1967 J. J. JUSTICE 3,314,093
MULLING OF SHOE UPPERS
Filed Nov. 24, 1964 12 Sheets-Sheet 7

April 18, 1967 J. J. JUSTICE 3,314,093
MULLING OF SHOE UPPERS
Filed Nov. 24, 1964 12 Sheets-Sheet 11
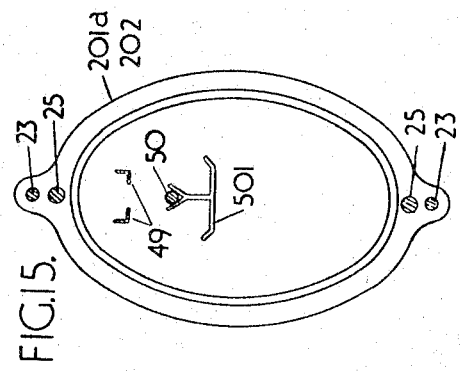
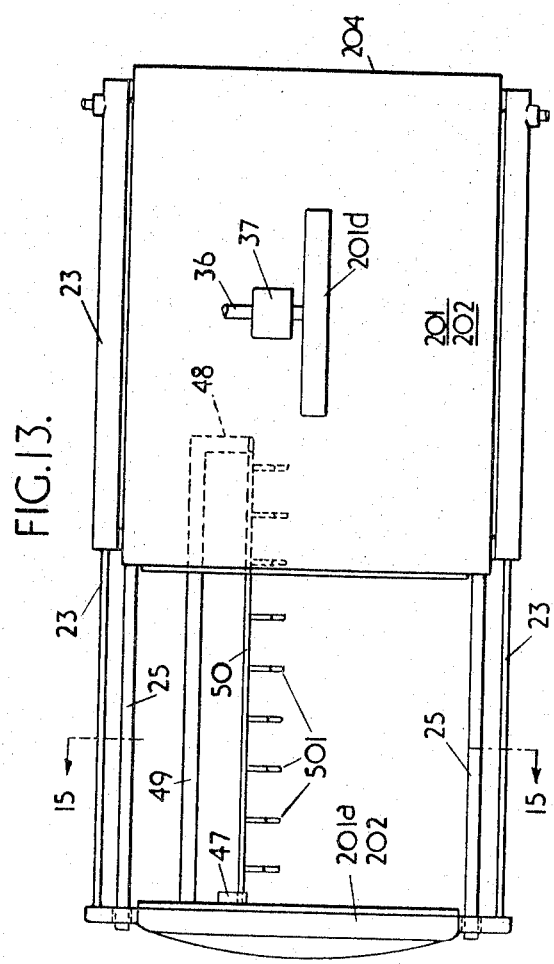

April 18, 1967 J. J. JUSTICE 3,314,093
MULLING OF SHOE UPPERS
Filed Nov. 24, 1964 12 Sheets-Sheet 12
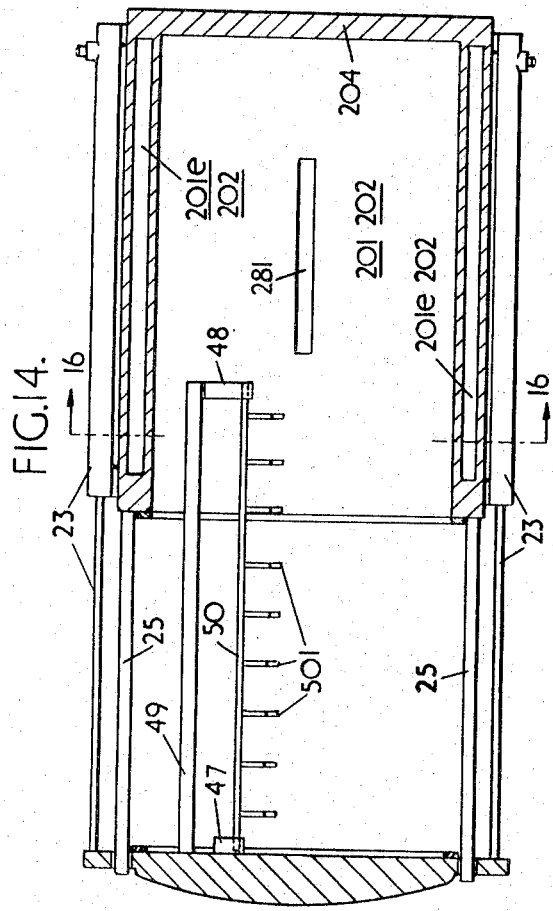
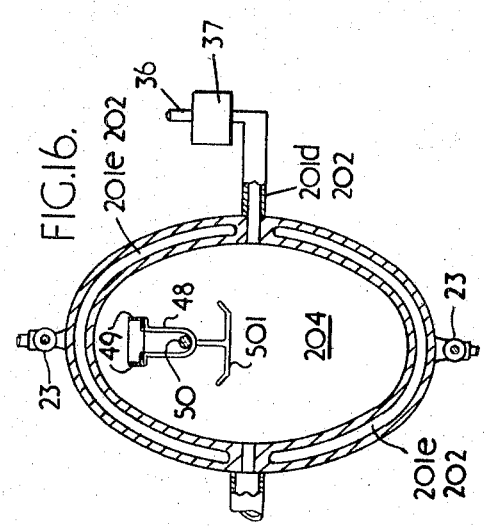

United States Patent Office 3,314,093
Patented Apr. 18, 1967

3,314,093
MULLING OF SHOE UPPERS
John James Justice, Baswich, England, assignor to Lotus Limited, Stafford, England, a corporation of Great Britain and Northern Ireland
Filed Nov. 24, 1964, Ser. No. 413,595
24 Claims. (Cl. 12—142)

This invention has reference to the mulling of shoe uppers and has for its objective to provide a method of and apparatus for mulling shoe uppers which is automatic and which enables the mulling of "closed" shoe uppers to be effected in a much shorter period of time than heretofore.

Accordingly the invention consists of a method of mulling shoe uppers which resides in the steps of first introducing the shoe uppers to be mulled into an hermetically sealable chamber and then hermetically sealing the said chamber subsequently evacuating the atmosphere from the said sealed chamber and then introducing a humidifying atmosphere into the evacuated chamber for a predetermined time and finally removing the mulled shoe uppers at the expiry of such time, the processes of sealing, evacuating and humidifying being effected automatically according to a predetermined timed cycle.

The invention also consists of a method of mulling shoe uppers which resides in the steps of first introducing the shoe uppers to be mulled into an hermetically sealable chamber and then hermetically sealing the said chamber, subsequently evacuating the atmosphere from the sealed chamber and simultaneously or substantially simultaneously reducing the pressure in a boiler containing water which is maintained continuously at a constant level and at a temperature slightly below that of the boiling point of water at standard atmospheric pressure so as to occasion the boiling of the water at a lower temperature than the normal boiling point and concurrently drawing off the steam evolved at the said lower temperature into the chamber to provide a humidifying atmosphere in the sealed chamber and finally removing the mulled shoe uppers from the chamber at the expiry of a predetermined period of time, the processes of sealing, evacuating and humidifying being effected automatically according to a predetermined timed cycle.

The invention further consists in the operation in the mulling of shoe uppers according to the aforesaid methods of causing air at a uniform temperature to flow continuously around the sealable chamber or chambers in which mulling takes place.

The invention yet further resides in the operation in the mulling of shoes in accordance with the methods aforesaid of causing liquid at a relatively uniform temperature to flow continuously through jackets arranged around or partially around the sealable chamber or chambers in which mulling takes place.

The invention also resides in the method of mulling shoe uppers substantially as will be described hereinafter.

The invention also resides in apparatus for effecting the mulling of shoes in accordance with the methods aforesaid substantially as will be described hereinafter.

The invention still further resides in shoes whenever incorporating uppers mulled in accordance with the methods aforesaid.

The invention will now be described with particular reference to the accompanying drawings which illustrate somewhat diagrammatically two constructions of apparatus for effecting the mulling of shoe uppers in accordance with the invention.

In the drawings:

FIGURE 5 is a fragmentary view in elevation showing one of the sealable chambers in which mulling is effected as depicted in FIGURES 1 and 2 open.

FIGURE 6 is a fragmentary view mainly in section illustrative of one of the sealable chambers in which mulling is effected as depicted in FIGURES 1 and 2 closed.

FIGURE 7 is a cross-section taken on the plane indicated by the line 7—7 in FIGURE 5 looking in the direction of the arrows to the said line.

FIGURE 8 is a cross-section taken on the plane indicated by the line 8—8 in FIGURE 6 looking in the direction of the arrows to the said line.

FIGURE 13 is a fragmentary view in elevation illustrative of one of the sealable chambers in which mulling is effected as depicted in FIGURES 9 and 10 open.

FIGURE 14 is a fragmentary view mainly in section illustrative of one of the sealable chambers in which mulling is effected as depicted in FIGURES 9 and 10 also open.

FIGURE 15 is a cross-section taken on the plane indicated by the line 15—15 in FIGURE 13 looking in the direction of the arrows to the said line, and FIGURE 16 is a cross-section taken on the plane indicated by the line 16—16 in FIGURE 13 looking in the direction of the arrows to the said line.

Figure 1:
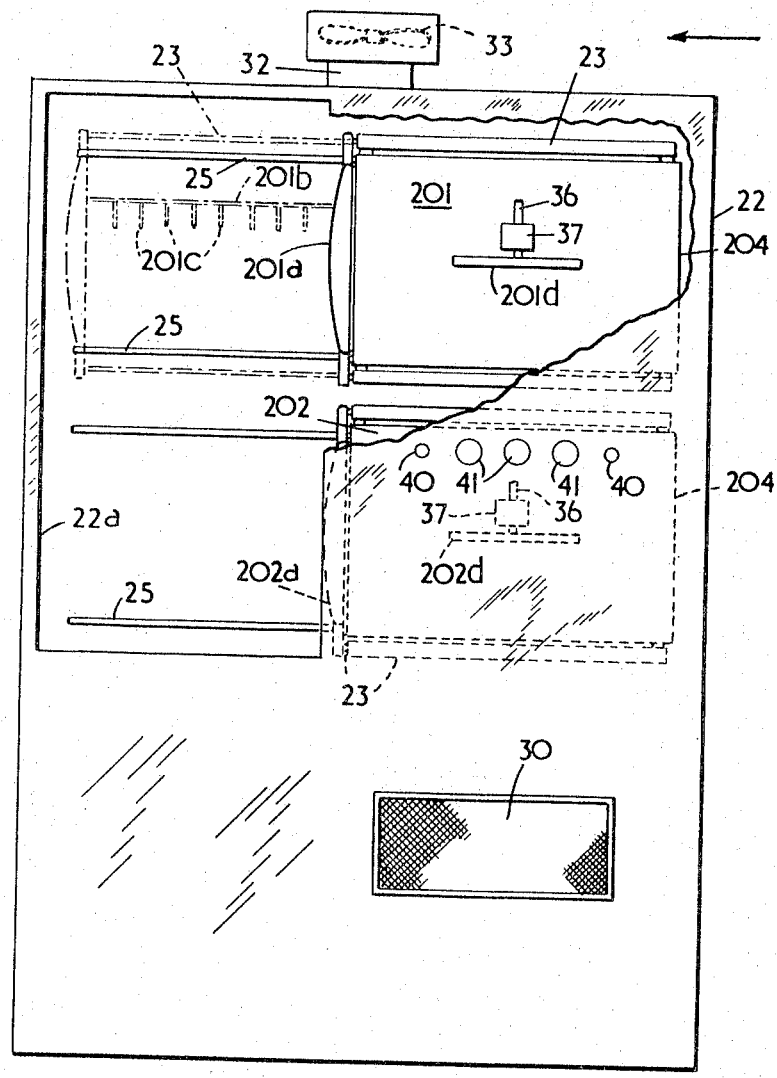
FIGURE 1 is a front view illustrative of one construction of apparatus for effecting the mulling of shoe uppers in accordance with the invention.

In the drawings like numerals of reference denote similar or analogous parts in the several views and where desirable parts such as pipe-lines and electrical wiring connections are omitted for the sake of clearness and without detracting from an understanding of the invention by those skilled in the art since pipe-lines and electrical wiring may be led to their associated components in a variety of ways.

Figure 2:
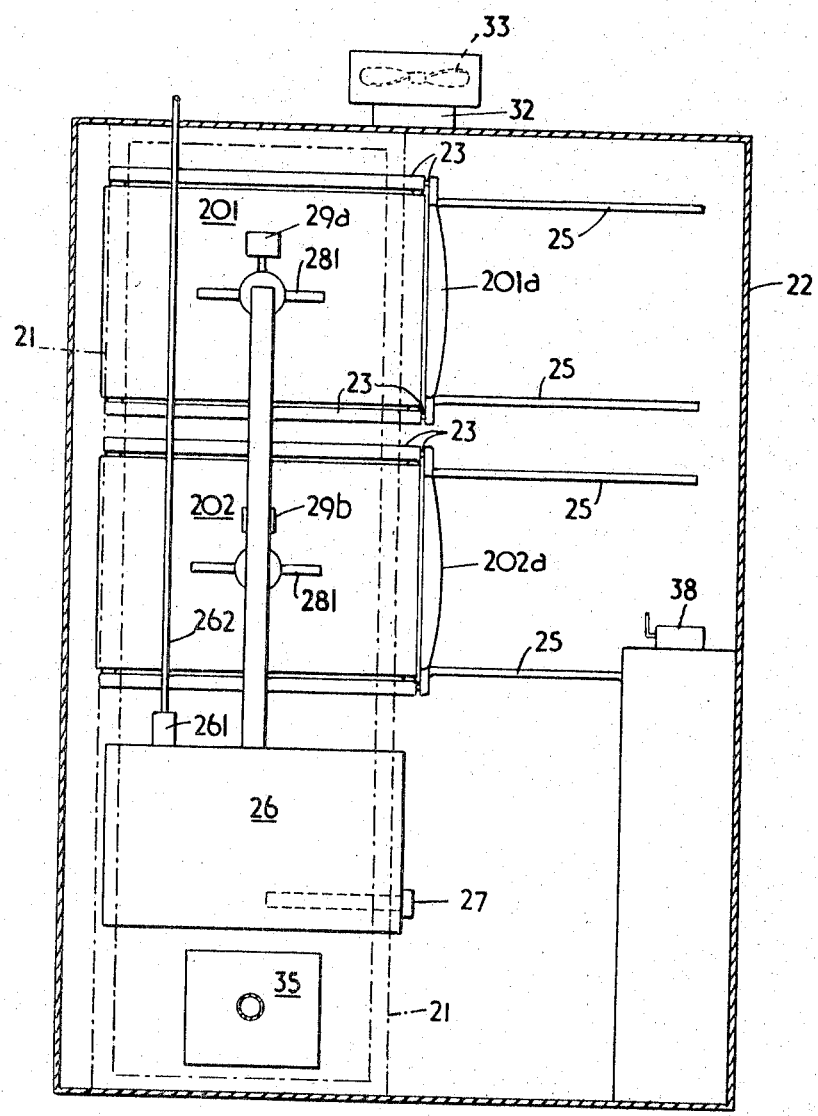
FIGURE 2 is a rear view of the apparatus seen in FIGURE 1.
Figure 3:
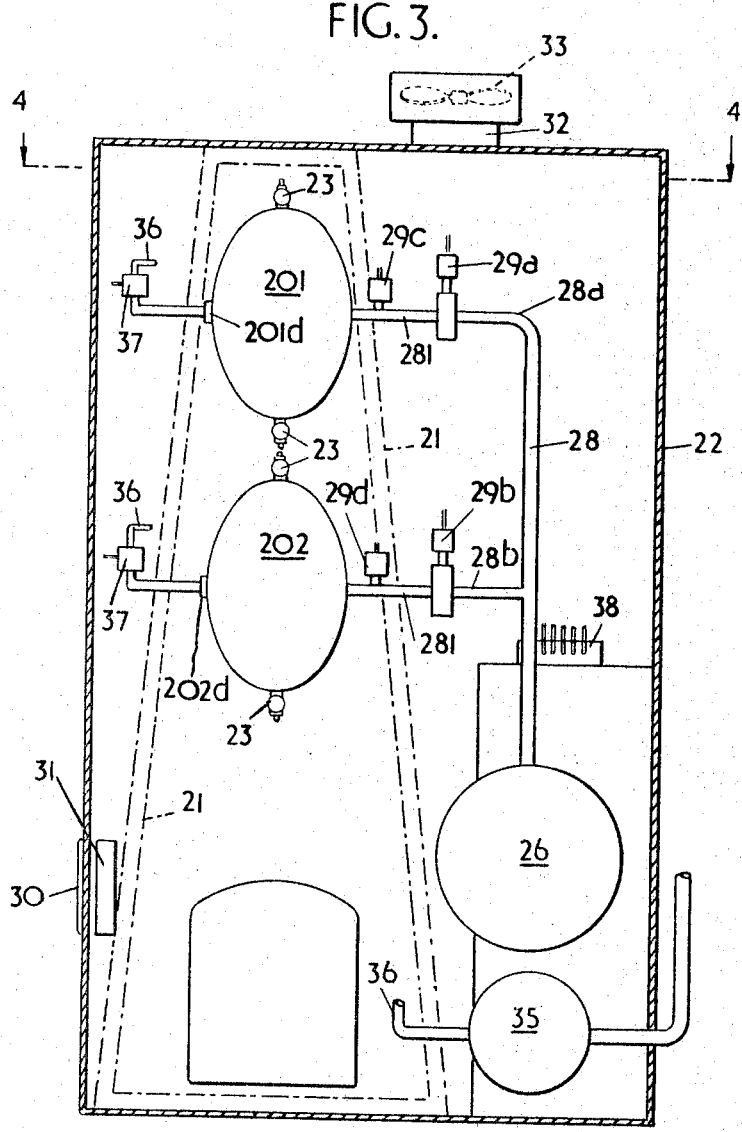
FIGURE 3 is an end view of the apparatus illustrated in FIGURES 1 and 2 looking in the direction of the arrow in FIGURE 1.
Figure 4:
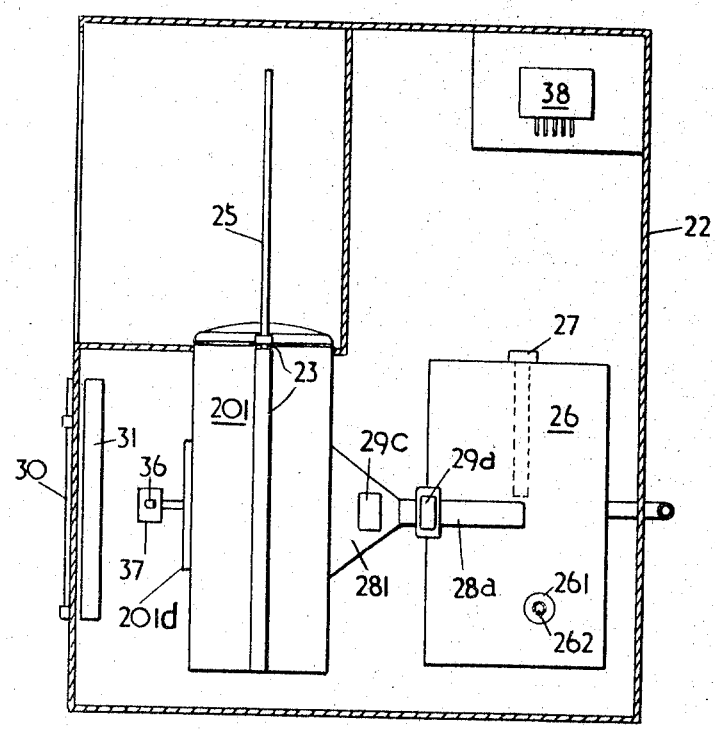
FIGURE 4 is a sectional view in plan taken on the plane indicated by the line 4—4 in FIGURE 3 looking in the direction of the arrows to the said line.

Dealing first with the method of mulling shoe uppers utilising the apparatus illustrated in FIGURES 1 to 8 of the drawings.

According to the said embodiment of the invention the mulling of shoe uppers is performed with the aid of apparatus incorporating a pair of sealable chambers 201, 202 of eliptical cross-section which are arranged in a superposed relationship with their major axes vertical in a stand 21 which conveniently may be fabricated from angle section metal and which is enclosed within a sheet metal encasement 22.

One end of each sealable chamber 201, 202 is closed as at 204 whilst the other end is open and is adapted to be sealed hermetically by a cover plate 201a, 202a respectively said cover plates 201a and 202a being adapted for movement toward and away from the open end of the respective sealable chambers 201, 202 through the agency of a fluid actuated piston and cylinder mechanisms 23 of known construction and manner of operation see FIGURES 5 and 6.

Each cover plate 201a, 202a has associated therewith a hollow sealing ring 24 of asbestos composition.

The cover plates 201a, 202a are adapted for a sliding movement on horizontally disposed rods 25 which project from the walls of the respective sealable chambers 201, 202.

Each cover plate 201a, 202a is provided with an inwardly directed longitudinal rail 201b, 202b which is slidable with the respective cover plate 201a, 202a and which is provided with equidistantly spaced dependant hooks 201c, 202c from which the uppers to be mulled are suspended.

Disposed within the encasement 22 and at the rear of the stand 21 is a horizontally disposed boiler 26 in which a constant level of water is maintained through the agency of a float controlled feed line or analogous mechanism of conventional construction (not shown).

Disposed within the boiler 26 is a thermostatically controlled immersion heater 27 which is set so as to maintain the water in the boiler 26 at a temperature slightly below the standard boiling point of water, i.e., below a temperature of 212° F. at a pressure of 760 mm.

The boiler 26 is provided with an outlet duct 28 incorporating branches 28a and 28b which communicate with ports 281 in the walls of the sealable chambers 201, 202.

The branch 28a is provided with a valve 29a for controlling the admission of steam to the upper sealable chamber 201 whilst the other branch 28b is provided with a valve 29b for controlling the admission of steam to the lower sealable chamber 202. The branches 28a, 28b are also provided with valves 29c, 29d respectively for relieving pressure in the sealable chambers 201, 202 at the expiry of a mulling period.

The valves 29a and 29b, 29c, 29d conveniently are of a known solenoid controlled fluid actuable piston and cylinder type and are adapted for automatic operation in a predetermined cycle as will be described hereinafter.

At the front and below the sealable chambers 201 and 202 the encasement 22 is provided with a grille 30 to the rear of which is disposed a honeycomb radiator 31 through which water is adapted to be circulated at a constant temperature.

Fitted to the top of the encasement 22 is an outlet duct 32 within which is disclosed an electricity driven axial flow fan 33.

Thus when the apparatus is in use a current of air is drawn through the grille 30 and radiator 31 and caused to flow upwardly through the interior of the encasement 22 around the sealable chambers 201, 202 and out through the outlet duct 32 in the top of the encasement 22.

The sealable chambers 201, 202 are also associated with a vacuum exhauster pump 35 the suction intake whereof is in communication with ports 201d, 202d in the walls of the sealable chambers 201, 202 by way of pipes 36 opening and closing of the suction ports 201d, 202d being under the control of a solenoid controlled fluid actuable piston and cylinder type valves 37 as and for a purpose to be described hereinafter.

The operations of closing and opening the cover plates 201a, 202a of the sealable chambers 201, 202, the bringing into action of the exhauster pump 35, the introduction of steam into the sealable chambers 201, 202 and the exhausting of steam from the sealable chambers 201, 202 at the expiry of the mulling time are controlled by an electrical timing controller 38 of known kind which conveniently is of the well-known drum type and which operates on a predetermined timed cycle.

The encasement 22 is provided with an opening 22a at the upper left-hand corner of the front for the purpose of loading and unloading the depending hooks 201c, 202c as and when required.

The starting of the control cycle is initiated by the pressing of two press buttons 40 which are spaced apart so that both hands must be used for pressing the buttons thereby ensuring that the hands of the operator cannot be trapped during the closing of the cover plates 201a, 202a.

The encasement 22 is also fitted with pressure and temperature gauges 41.

The invention is practised with apparatus as hereinbefore described and is illustrated in FIGURES 1 to 8 of the drawings utilising the sealable chambers 201, 202 alternately as follows:

Assuming the cover plate 201a of the sealable chamber 201 to be in the withdrawn or open position as seen in FIGURE 5 the shoe uppers to be mulled are suspended from the hooks 201c depending from the rail 201b. When the hooks 201c have been loaded the operator presses both the press buttons 40 simultaneously whereupon the timing controller 38 is set into operation to occasion the operation of the relevant cylinder and fluid operated mechanism 23 for drawing the appropriate cover plate 201a into hermetically sealing contact with the open end of the respective chamber 201, see FIGURE 6.

The timing controller 38 initially occasions the opening of the valves 37 so that the exhauster pump 35 may operate to evacuate the atmosphere in the loaded chamber 201 to near vacuum conditions.

At the expiry of the period of time set for effecting the evacuation of the loaded chamber 201 the valve 29a appropriate to the said chamber 201 is caused to open so that the pressure in the boiler 26 is reduced whereby the water in the boiler 26 commences to boil at a temperature lower than the normal point of water a convenient temperature to be attained being 206° F.

Concurrently with the pressure relief valves 29c closed the steam evolved from the boiling water is drawn into the relevant chamber 201 for effecting the mulling of shoe uppers.

At the expiry of the predetermined mulling time the appropriate pressure relief valve 29c is opened and subsequently the chamber containing the mulled uppers is opened automatically by the piston and cylinder mechanism 23 under the control of the timing control for permitting of the removal of the mulled uppers.

Meanwhile the hooks 202b of the sealable chamber 202 of the now open sealable chamber 202 have been loaded so that when the chamber 201 opens the operator presses the buttons 40 to occasion the closure of the sealable chamber 202 and the initiation of a mulling cycle therein.

It is to be appreciated that since when the apparatus is in use a current of air is drawn from the air inlet grille 30 through the radiator 31 and caused to flow upwardly around the sealable chambers 201 and 202 and out through the outlet 32 in the top of the encasement 22 so a current of air circulates around the mulling chambers 201, 202 at a temperature which ensures that the maximum dew point shall be exceeded in the sealable chambers 201, 202 and thus ensure that mulling shall be effected under the most favourable circumstances that is a temperature above the maximum dew point temperature is maintained in the sealable chamber 201, 202 in which the mulling takes place.

Figure 9:
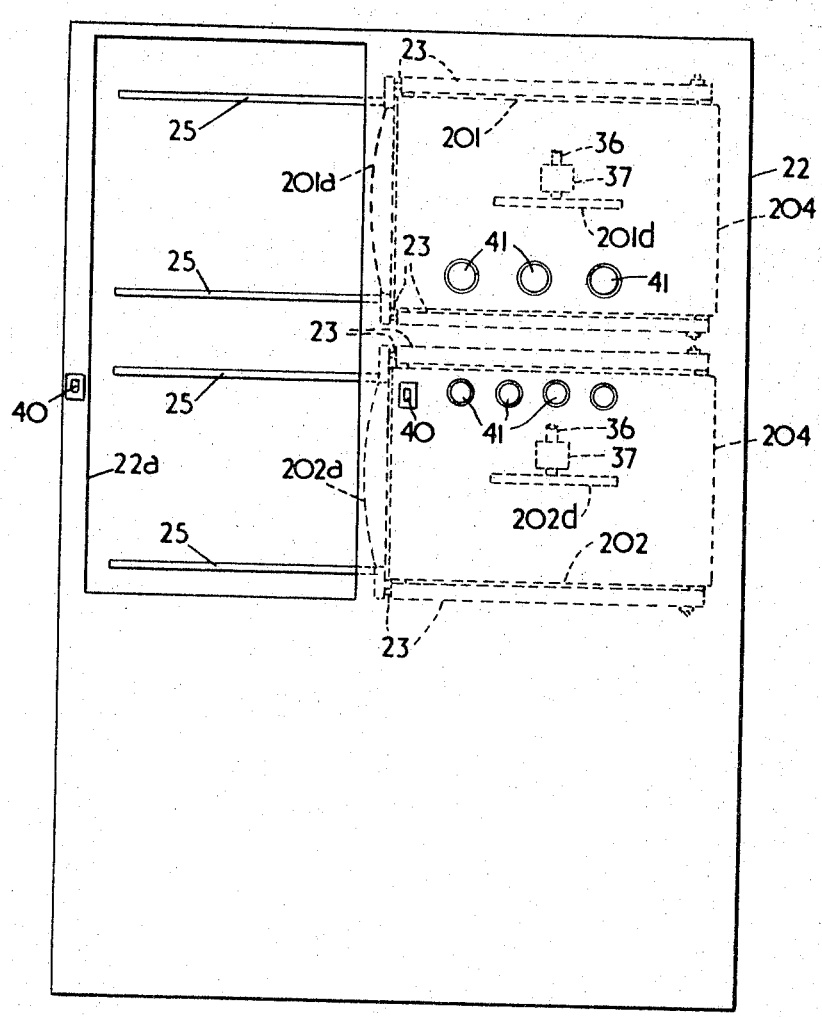
FIGURE 9 is a front elevation of another construction of apparatus for effecting the mulling of shoes in accordance with the invention.
Figure 10:
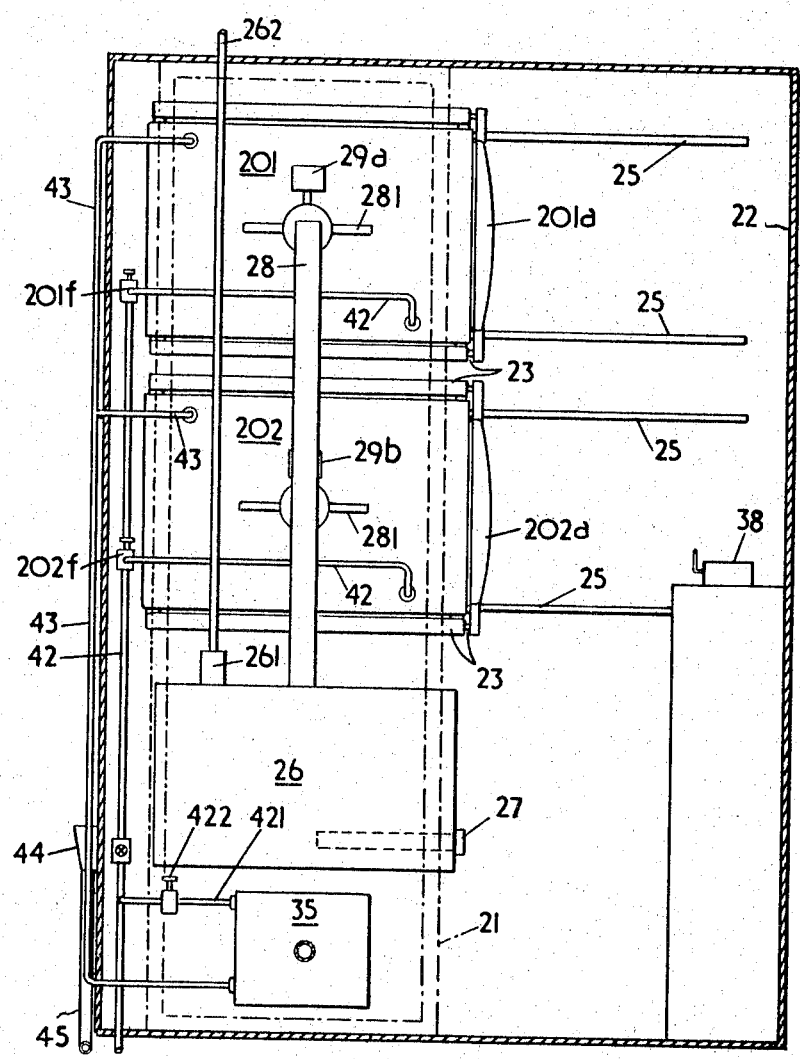
FIGURE 10 is a rear view of the apparatus illustrated in FIGURE 9.
Figure 11:
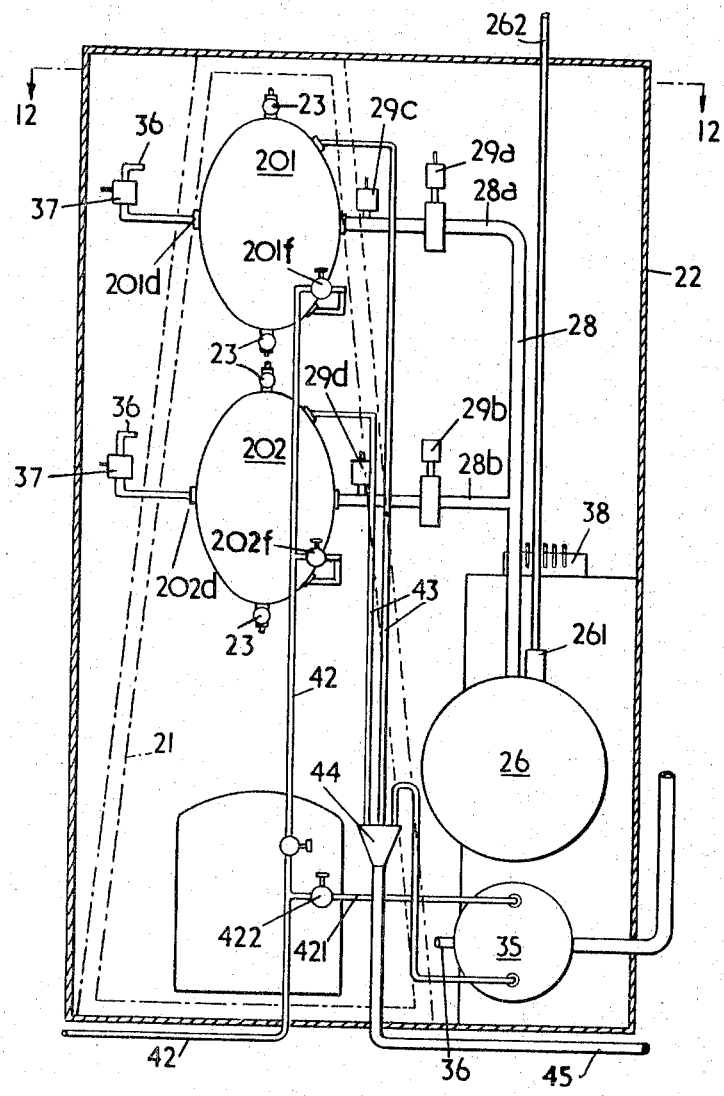
FIGURE 11 is an end view of FIGURE 9 looking in the direction of the arrow in the said figure.
Figure 12:
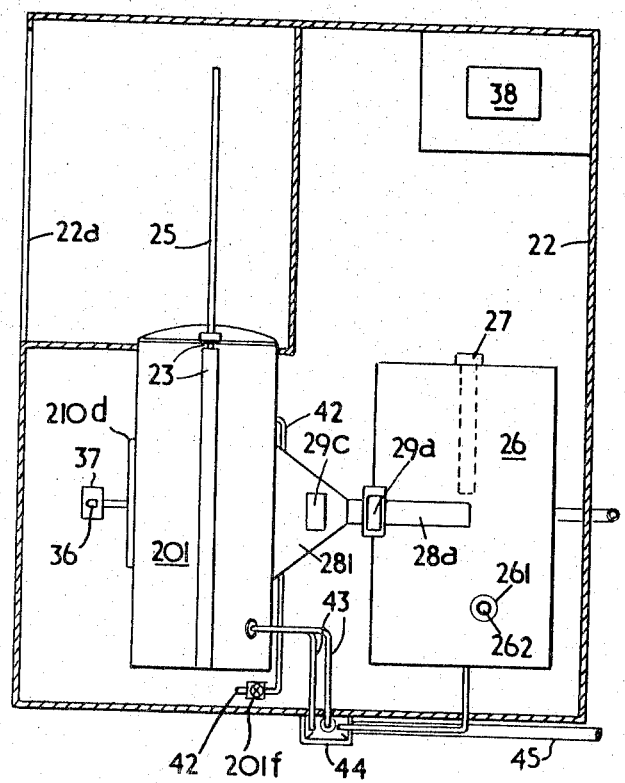
FIGURE 12 is a sectional view in plan taken on the plane indicated by the line 12—12 in FIGURE 11 looking in the direction of the arrows to the said line.

According to the manner of carrying the invention into effect in conjunction with the apparatus depicted in FIGURES 9 to 16 each of the chambers 201, 202 is provided with a water jacket 201e, 202e which may completely or partially surround the relevant chambers. These water jackets 201e, 202e are connected in series with a pipeline 42 connected to the normal water supply.

The water is circulated upwardly at mains pressure through the water jackets 201e, 202e and then returned by down pipes 43 into a funnel 44 which opens into the waste pipe 45.

The pipe-line 42 is provided with control cocks 201f, 202f so that the rate of flow through the individual water jackets 201e, 202e can be adjusted as required, the rate of flow being readily ascertainable by observation of the discharge into the funnel 44 aforesaid from the respective down pipes.

The pipe-line 42 is also formed with a branch pipe-line 421 leading to the water jacket of the exhauster pump 35. This branch pipe-line 421 is provided with its own independent control cock 422.

Thus it will be seen that in carrying the invention into effect with the apparatus last described a cooling medium at a relatively uniform temperature is circulated around each sealing chamber 201 and 202 to maintain the temperature above the maximum dew point.

As illustrated in the said FIGURES 9 to 16 the cover plate 201a, 202a of each sealable chamber 201, 202 is provided with a support 47 which in conjunction with a hanger 48 depending from the inner end of an inwardly projecting rail 49 serves to support removable carriers 50 provided with hooks 501 from which the shoe uppers to be mulled may be suspended, the carriers 50 being removable from the respective support 47 and hanger 48 by raising the end of the carrier adjacent to a cover plate out of engagement with the relevant support 47 and withdrawing the other end of the carrier 50 from the associated hanger 48.

It has been found advantageous particularly with the arrangement illustrated in FIGURES 9 to 16 to arrange for both sealable chambers 201 and 202 to open and close together instead of working the sealable chambers 201, 202 alternately as described hereinbefore.

As a safeguard with apparatus constructed as depicted in the said FIGURES 9 to 16 it is still required also that two push buttons 40 be manipulated before the sealable chambers 201, 202 can be closed and a mulling operation instituted.

In each of the apparatus described and illustrated the timing controller 38 is caused to occasion the automatic opening of the pressure relief valves 29c, 29d and of the sealable chambers 201, 202 after the expiry of a predetermined mulling period.

Further in each apparatus illustrated the boiler 26 is provided with a safety valve 261 and a "blow off" pipe 262.

It will be understood that if desired apparatus for effecting mulling of shoe uppers in accordance with the invention may incorporate a single sealable chamber instead of two such sealable chambers as described although in general use it is found that the two sealable chambers are sufficient.

Conveniently the mulling method and apparatus as aforesaid are employed in conjunction with "heat setters" which when the mulled closed shoe uppers are fitted on to a last cause the said shoe uppers to have a skintight fit on the last.

If preferred an aerosol of an atomised spray of water may be introduced into each sealable chamber as the humidifying medium in the place of steam, in which event the means for introducing the humidifying medium and the period of time during which such a humidifying medium is introduced are controlled and determined by a timing controller in an analogous manner to that hereinbefore described in which the humidifying medium was steam.

If desired the sealable chambers 201, 202 in the arrangement illustrated in FIGURES 1 to 8 may be water jacketed in the manner illustrated in FIGURES 9 to 16 and likewise the sealable chambers 201, 202 of the arrangement illustrated in FIGURES 9 to 16 may have a current of air circulated therearound in the manner illustrated in FIGURES 1 to 8.

It is found in practice that utilising steam as the humidifying medium a mulling cycle of two to four minutes dependent upon the weight and the porosity of the leather being treated is sufficient for efficient mulling.

What we claim is:

1. A method of mulling shoe uppers which resides in the steps of first introducing the shoe uppers to be mulled into an hermetically sealable chamber and then hermetically sealing the said chamber subsequently evacuating the atmosphere from the said sealed chamber and then introducing a humidifying atmosphere into the evacuated chamber for a predetermined time and finally removing the mulled shoe uppers at the expiry of such time, the processes of sealing, evacuating and humidifying being effected automatically according to a predetermined timed cycle.

2. A method of mulling shoe uppers which resides in the steps of first introducing the shoe uppers to be mulled into an hermetically sealable chamber and then hermetically sealing the said chamber, subsequently evacuating the atmosphere from the sealed chamber and simultaneously or substantially simultaneously reducing the pressure in a boiler containing water which is maintained continuously at a constant level and at a temperature slightly below that of the boiling point of water at standard atmospheric pressure so as to occasion the boiling of the water at a lower temperature than the normal boiling point and concurrently drawing off the steam evolved at the said lower temperature into the chamber to provide a humidifying atmosphere in the sealable chamber and finally removing the mulled shoe uppers from the chamber at the expiry of a predetermined period of time, the processes of sealing, evacuating and humidifying being effected automatically according to a predetermined timed cycle.

3. In a method of mulling shoe uppers as claimed in claim 1 causing air at a uniform temperature to flow continuously around the sealable chamber or chambers in which mulling takes place said air being at a temperature which ensures that the temperature in the sealable chamber or chambers shall be maintained above the maximum dew point temperature.

4. In a method of mulling shoe uppers as claimed in claim 1 causing liquid at a relatively uniform temperature to flow continuously through jackets arranged around or partially around the sealable chamber or chambers in which mulling takes place, said liquid being at a temperature which ensures that the temperature in the sealable chamber or chambers shall be maintained above the maximum dew point.

5. In a method of mulling shoe uppers as claimed in claim 2 causing liquid at a relatively uniform temperature to flow continuously through jackets arranged around or partially around the sealable chamber or chambers in which mulling takes place, said liquid being at a temperature which ensures that the temperature in the sealable chamber or chambers shall be maintained above the maximum dew point.

6. In a method of mulling shoe uppers as claimed in claim 1 utilising steam as the humidifying medium.

7. In a method of mulling shoes as claimed in claim 1 utilising as the humidifying medium an aerosol of an atomised spray of water.

8. In a method of mulling shoe uppers as claimed in claim 1 in which more than one sealable chamber is employed arranging for the chambers to be used alternately.

9. In a method of mulling shoe uppers as claimed in claim 1 in which more than one sealable chamber is employed arranging for the chambers to be used concurrently.

10. Apparatus for effecting the mulling of shoe uppers incorporating one or more hermetically sealable chambers having cover plates which may be moved for occasioning the opening and closing of the sealable chamber or chambers as required, means for suspending the uppers to be mulled within the said sealable chamber or chambers, means for evacuating the atmosphere in the sealable chamber or chambers as required, means introducing a humidifying atmosphere into the sealable chamber or chambers as required and timing means for occasioning automatically in a predetermined timed cycle the operations of closing the sealable chamber or chambers after loading with the uppers to be mulled, evacuating the atmosphere in the loaded sealable chamber or chambers when closed, introducing a humidifying atmosphere into the closed sealable chamber or chambers and occasioning the opening of the sealable chamber or chambers on the expiry of the period of time prescribed for the performance of a mulling operation.

11. Apparatus for effecting the mulling of shoe uppers incorporating one or more hermetically sealable chambers having cover plates which are movable for occasioning the opening of and the closing of the sealable chamber or chambers as required, means for suspending the uppers to be mulled within said sealable chamber or chambers, means for evacuating the atmosphere in the sealable chamber or chambers as required, a boiler containing water which is maintained continuously at a constant level and at a temperature slightly below that of the boiling point of water at standard atmospheric pressure, communicating means between said boiler and the sealable chamber or chambers, valve means which govern communication between the boiler and the sealable chamber or chambers and which operate to permit communication during and subsequent to the evacuation of the atmosphere in the sealable chamber or chambers so that due to the lowering of the pressure which simultaneously takes place in the boiler the water in the boiler commences to boil at a lower temperature than the normal boiling point and whereby the steam evolved as a consequent of the boiling of the water concurrently is fed into the sealable chamber or chambers to constitute a humidifying atmosphere therein and timing means for occasioning automatically in a predetermined timed cycle the operation of closing the sealable chamber or chambers after loading with the uppers to be mulled evacuating the atmosphere in the sealable chamber or chambers when closed and concurrently reducing the pressure in the boiler so that the steam evolved on boiling of the water is introduced into the sealable chamber or chambers as a humidifying atmosphere at a lower temperature than that of the steam derived from water boiling at the normal boiling point and for occasioning the opening of the sealable chamber or chambers on the expiry of a period of time prescribed for the performance of a mulling operation.

12. Apparatus for effecting the mulling of shoe uppers as claimed in claim 10 in which provision is made for occasioning the flow around the sealable chamber or chambers of air maintained at a uniform temperature which ensures that the temperature in the sealable chamber or chambers shall be maintained above the maximum dew point temperature.

13. Apparatus as claimed in claim 10 in which the sealable chamber or each sealable chamber is water jacketed and in which water at a uniform temperature which ensures that the temperature in the sealable chamber or chambers is maintained above the maximum dew point temperature is circulated continuously through the water jackets.

14. Apparatus as claimed in claim 11 in which the sealable chamber or each sealable chamber is water jacketed and in which water at a uniform temperature which ensures that the temperature in the sealable chamber or chambers is maintained above the maximum dew point temperature is circulated continuously through the water jackets.

15. Apparatus as claimed in claim 12 in which the current of air is drawn through a water cooled radiator and circulated around the sealable chamber or chambers by a fan.

16. Apparatus according to claim 13 in which the cooling water is derived from the mains and is circulated with an upward flow through the water jacket or jackets and subsequently returned by a downpipe.

17. Apparatus as claimed in claim 10 in which provision is made for opening and closing the cover plate or plates of the sealable chamber or chambers, by power operated means.

18. Apparatus as claimed in claim 10 in which valve means is provided for relieving the pressure in a sealable chamber or chambers at the expiry of the period of time prescribed for the performance of a mulling operation and in which the control of the valve means for effecting the relieving of the pressure in the sealable chamber or chambers is effected by the automatic timing means preparatory to the said timing means occasioning the opening of the sealable chamber or chambers.

19. Apparatus as claimed in claim 10 in which means is provided for ensuring that the fingers of the operator cannot be trapped during the operation of automatically closing the cover plates.

20. Apparatus as claimed in claim 13 in which means is provided for controlling the flow of cooling liquid through the water jacket or jackets of the sealable chamber or chambers.

21. Apparatus according to claim 17 in which the opening and closing of the cover plate or plates in the sealable chamber or chambers is effected by pneumatic piston and cylinder mechanism and in which the operation of the said mechanism is effected by electro-pneumatic valve means under the control of the automatic timing means.

22. Apparatus as claimed in claim 10 in which the cover plate or each cover plate for the sealable chamber or chambers is provided with means which is movable with the said cover plate or cover plates and which is provided with means for suspending therefrom the uppers to be mulled.

23. Apparatus as claimed in claim 22 in which said means is a fixture with the cover plate or cover plates.

24. Apparatus as claimed in claim 22 in which the said means is removable from the cover plate or cover plates for the purpose of attaching the uppers thereto preparatory to mulling and for removing the mulled uppers therefrom after mulling.

References Cited by the Examiner

UNITED STATES PATENTS

| | | | |
|---|---|---|---|
| 1,992,007 | 2/1935 | Ingraham | 12—59.7 X |
| 2,005,765 | 6/1935 | Wright | 12—41.5 X |
| 2,206,275 | 7/1940 | Woodberry | 12—142 |
| 2,973,531 | 3/1961 | Bromfield | 12—142 |

PATRICK D. LAWSON, *Primary Examiner.*